US010851642B2

(12) United States Patent
Ahmadi Kalateh Ahmad et al.

(10) Patent No.: US 10,851,642 B2
(45) Date of Patent: Dec. 1, 2020

(54) ELECTROMAGNETIC RANGING WITH ROTATING COIL ANTENNA TOOL

(71) Applicant: Halliburton Energy Services, Inc., Houston, TX (US)

(72) Inventors: Akram Ahmadi Kalateh Ahmad, Houston, TX (US); Burkay Donderici, Pittsford, NY (US)

(73) Assignee: Halliburton Energy Services, Inc., Houston, TX (US)

(*) Notice: Subject to any disclaimer, the term of this patent is extended or adjusted under 35 U.S.C. 154(b) by 114 days.

(21) Appl. No.: 16/084,514

(22) PCT Filed: Apr. 21, 2016

(86) PCT No.: PCT/US2016/028636
§ 371 (c)(1),
(2) Date: Sep. 12, 2018

(87) PCT Pub. No.: WO2017/184145
PCT Pub. Date: Oct. 26, 2017

(65) Prior Publication Data
US 2019/0078432 A1  Mar. 14, 2019

(51) Int. Cl.
E21B 47/0228 (2012.01)
E21B 47/00 (2012.01)
(Continued)

(52) U.S. Cl.
CPC .......... E21B 47/0228 (2020.05); E21B 7/04 (2013.01); E21B 47/00 (2013.01); G01V 3/28 (2013.01)

(58) Field of Classification Search
CPC ...... E21B 47/00; E21B 47/02216; E21B 7/04; G01V 3/28
See application file for complete search history.

(56) References Cited

U.S. PATENT DOCUMENTS 5,589,775 A * 12/1996 Kuckes ............. E21B 47/02216
166/66.5
2009/0015260 A1 * 1/2009 Bittar ....................... G01V 3/30
324/333

(Continued)

FOREIGN PATENT DOCUMENTS

| WO | 2014066146 A1 | 5/2014 |
| WO | 2014089402 A2 | 6/2014 |
| WO | 2015047865 A1 | 4/2015 |

OTHER PUBLICATIONS

PCT Application Serial No. PCT/US2016/028636, International Search Report, dated Jan. 18, 2017, 3 pages.

(Continued)

Primary Examiner — David Carroll
(74) Attorney, Agent, or Firm — Gilliam IP PLLC

(57) ABSTRACT

A rotating coil antenna tool apparatus includes a transmitter coil and a receiver coil that are used for ranging to a target well. The transmitter coil transmits a first electromagnetic signal and the receiver coil receives second electromagnetic signal. At least one of the transmitting coil or the receiver coil is rotating while transmitting or receiving their respective signals. The receiver coil is inhibited from receiving the first electromagnetic signal. A relative distance and/or direction to the target well is determined based on the second electromagnetic signal.

20 Claims, 11 Drawing Sheets

(51) Int. Cl.
*E21B 7/04* (2006.01)
*G01V 3/28* (2006.01)

(56) References Cited

U.S. PATENT DOCUMENTS

| | | | | |
|---|---|---|---|---|
| 2010/0044108 A1* | 2/2010 | Bespalov | ............... | E21B 47/022 |
| | | | | 175/24 |
| 2011/0308794 A1* | 12/2011 | Bittar | ................. | G01V 3/26 |
| | | | | 166/254.2 |
| 2012/0109527 A1 | 5/2012 | Bespalov et al. | | |
| 2013/0057287 A1* | 3/2013 | Le | ................. | E21B 47/0905 |
| | | | | 324/346 |
| 2015/0091577 A1 | 4/2015 | Donderici et al. | | |
| 2015/0346381 A1 | 12/2015 | Donderici | | |
| 2016/0216397 A1* | 7/2016 | Donderici | ........... | E21B 47/0905 |

OTHER PUBLICATIONS

PCT Application Serial No. PCT/US2016/028636, International Written Opinion, dated Jan. 18, 2017, 12 pages.
CA Application Serial No. 3,017,109, Office Action, dated Jun. 28, 2019, 3 pages.
PCT Application Serial No. PCT/US2016/028636, International Preliminary Report on Patentability, dated Oct. 23, 2018, 13 pages.
Eurasian Application No. 201891846, First Office Action dated Mar. 23, 2020, 3 pages including English Summary.
Bittar, et al., "New Logging-While-Drilling Ranging Technique for SAGD: Theory and Experiment", SPE Annual Technical Conference and Exhibition, Oct. 10, 2012, 10 pages.
Jackson, "Classical Electrodynamics", John Wiley & Sons, New York City, 1975, p. 147.
Kuckes, et al., "An Electromagnetic Survey method for Directionally Drilling a Relief Well into a Blown Out Oil or Gas Well", Society of Petroleum Engineers Journal, Jun. 1984, pp. 269-274 (6 pages).

* cited by examiner

ELECTROMAGNETIC RANGING WITH ROTATING COIL ANTENNA TOOL

BACKGROUND

Determining the relative position and direction of a conductive pipe (such as a metallic casing) accurately and efficiently is desirable in a variety of drilling applications. For example, it is typically desirable to determine the relative distance and direction of a blown out well (i.e., target well) where the target well should be intersected very precisely by a relief well in order to stop the blowout. Other applications include the drilling of a well parallel to an existing well in steam assisted gravity drainage (SAGD) systems and tracking an underground drilling path using a current injected metallic pipe over the ground as a reference.

Different approaches exist for ranging to a target well. In one method, a current is induced on a target casing by transmitting electromagnetic (EM) waves via coil antennas. This induced current in turn causes the casing to radiate a secondary electromagnetic field. The amplitude of this secondary field can be used to determine the distance to the target casing. However, the transmitted EM signal may interfere with the reception of the secondary EM signal at the receiver.

DETAILED DESCRIPTION

Many examples described herein operate to provide information that assist in determining relative distance and direction from one well, such as a well being drilled, to another well. For example, an orthogonal Tx/Rx configuration with a rotating coil antenna source may be used to eliminate the interference of the stronger, direct EM signal from the transmitter to the receiver when determining the location of a target well in relation to a ranging well and, thus, improve the accuracy of the ranging operation. The receiver coil may rendered insensitive to the direct EM signal (e.g., inhibited) in other ways as well. The present examples may be utilized for well ranging with a desired and fixed separation between wells, well intersection, or well avoidance.

A "target well" may be defined herein as a well, the location of which is to be used as a reference by another well. The other well may be defined as a "ranging well". Other embodiments may reverse this terminology since the embodiments are not limited to any one well being the target well and any one well being the ranging well.

The antenna coil rotation discussed subsequently may be accomplished in different ways. For example, the antenna coils may be physically rotated by rotating the tool in which the coils are disposed or by some mechanism to physically rotate only the coils within the tool. In another example, the EM signals from the coils may be synthetically rotated while the coils remain physically stationary. Thus, as used herein, a rotating coil may refer to a physically rotating coil to produce a rotating EM signal or a synthetically rotating EM signal.

As one example, the transmitter and receiver coils may be rotated together by mounting them on independently moving sections of a bottom hole assembly (BHA) and independently adjusting the angle of the sections to be the same. In another example, the transmitter and receiver coils may be mounted on the same section of the BHA so that they naturally move together. They may also be electrically/synthetically rotated in the case of bi-axial or tri-axial collocated coils by adjusting the weight of each antenna in the set of collocated coils.

Figure 1:
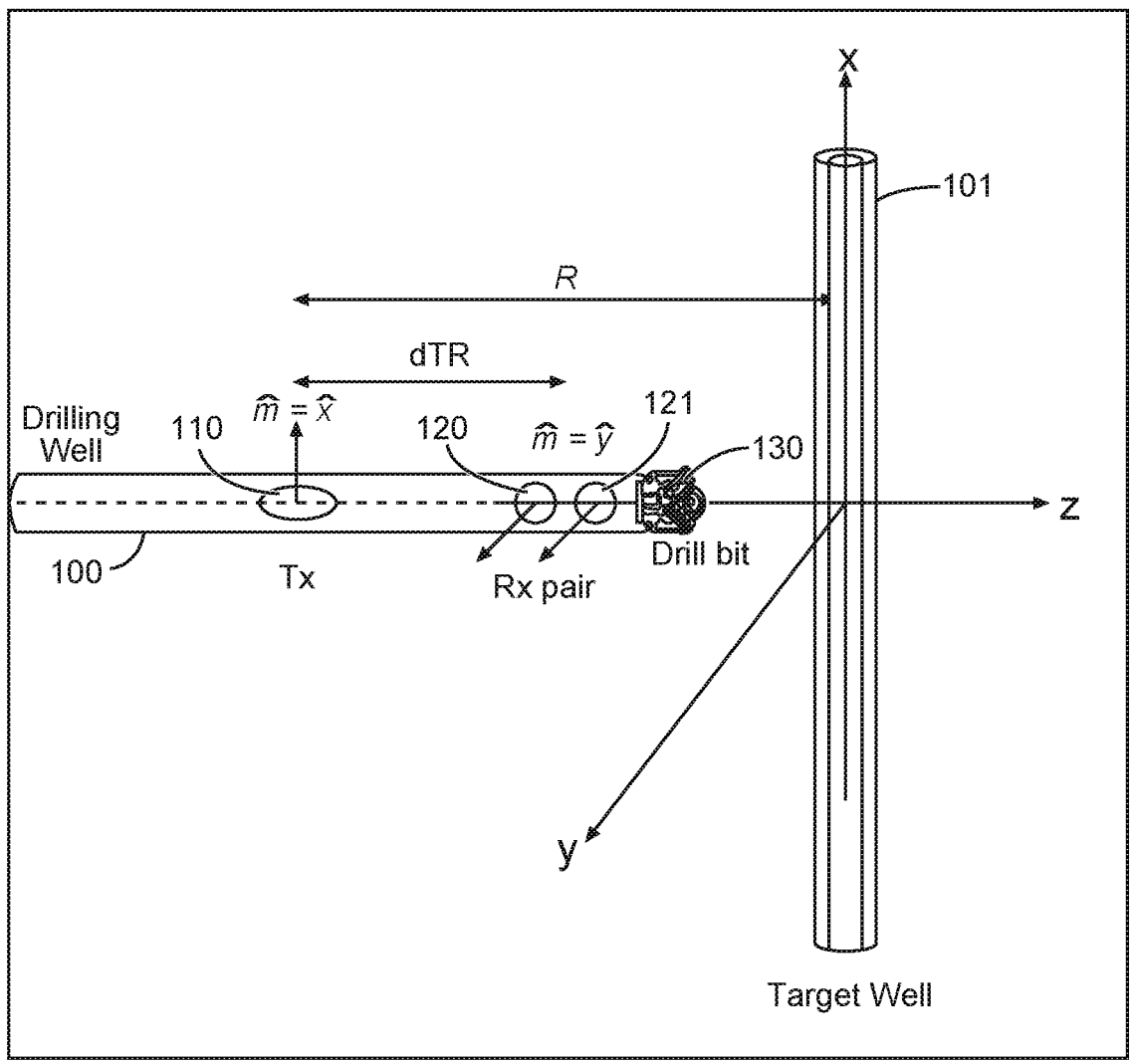
FIG. 1 is a diagram showing an example of a ranging system including a rotating coil antenna tool, according to aspects of the present disclosure.
Figure 10:
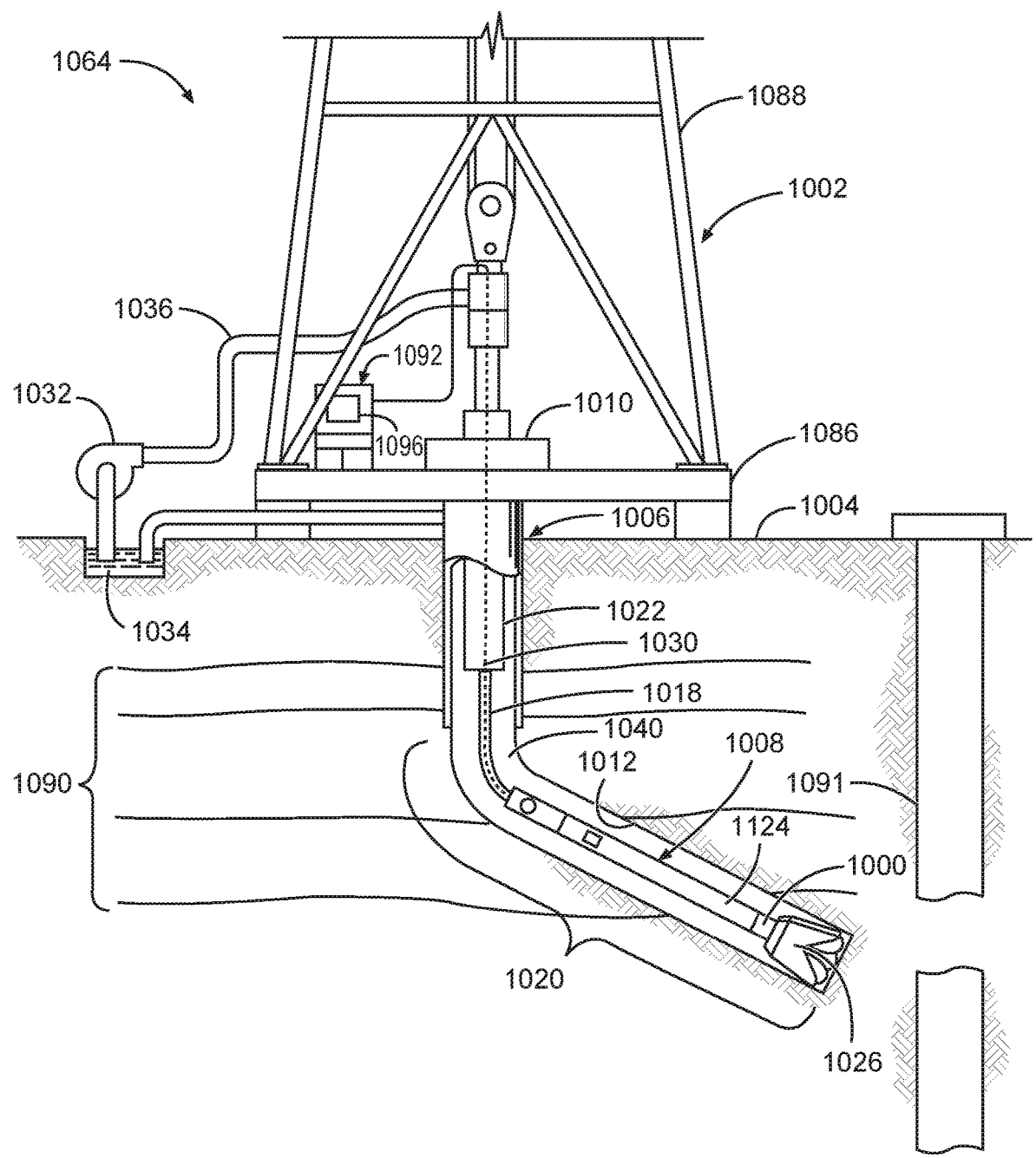
FIG. 10 is a diagram of a drilling system, according to aspects of the present disclosure.

FIG. 1 is a diagram showing an example of a ranging system including a rotating coil antenna tool, according to aspects of the present disclosure. This figure shows a cross section of a formation including a target well 101 along the x-axis and an approaching drilling well 100 along the z-axis. The drilling well 100 is being drilled by a drillstring, with a drill bit 130, that includes the tool apparatus having the transmitter coil 110 (i.e., transmitter) and at least one receiver coil 120, 121 (i.e., receiver). One example of a drilling operation with a drillstring is shown in FIG. 10 and described subsequently. While FIG. 1 shows two receivers 120, 121, other examples are not limited to this number.

The target well 101, whose principle axis is in the x-direction, is a distance R from the transmitter coil 110. The transmitter 110 and receivers 120, 121 are spaced apart a predetermined fixed distance dTR from each other.

The EM signal from the transmitter coil 110 is shown being transmitted orthogonally to the orientation of the receiver coils 120, 121. For example, the Tx EM signal ($\hat{m}=\hat{x}$) is shown transmitted along the x-axis while the receiver coils 120, 121 are shown receiving an EM signal from the target well along the y-axis ($\hat{m}=\hat{y}$). This orthogonal orientation is for purposes of illustration only since, as described subsequently, other Tx/Rx orientations are possible to achieve the reduction or elimination of the direct EM signal from the transmitter coil 110 to the receiver coils 120, 121.

Wellbores are generally lined with metallic casings (e.g., steel) to fortify the well structure and prevent a collapse of the wellbore wall. Since casings are more conductive than the formation around it, a strong coupling of an electric field to the target pipe occurs. This coupling of the electric field produces a conduction current on the target pipe. This current would then induce a magnetic field around the pipe whose magnitude can be found via the Biot-Savart law. If the induced current was constant, Biot-Savart law would reduce to Ampere's law. In practical situations, current induced on the pipe is not constant, but for purposes of the present examples, it is assumed that the magnetic field at a point is given by:

$$\vec{H}(\vec{r}) = \frac{I_{eff}}{2\pi R}\hat{\phi} \quad (1)$$

where $I_{eff}$ is an effective current whose value is not important for the present discussion and R is the radial distance from the target well to point $\vec{r}$.

In the system of FIG. 1, the receiver coil antennas 120, 121 have a magnetic dipole in a certain direction and hence they are only sensitive to the component of the magnetic field in that direction. This magnetic field characteristic is used in the present examples to eliminate the direct signal between the transmitter and receiver when determining the location of a target well in relation to a ranging well. In conventional systems, the direct signal from the transmitter to the receiver may result in interference to the received signals and, thus, reduced accuracy for ranging to another well.

Figure 2:
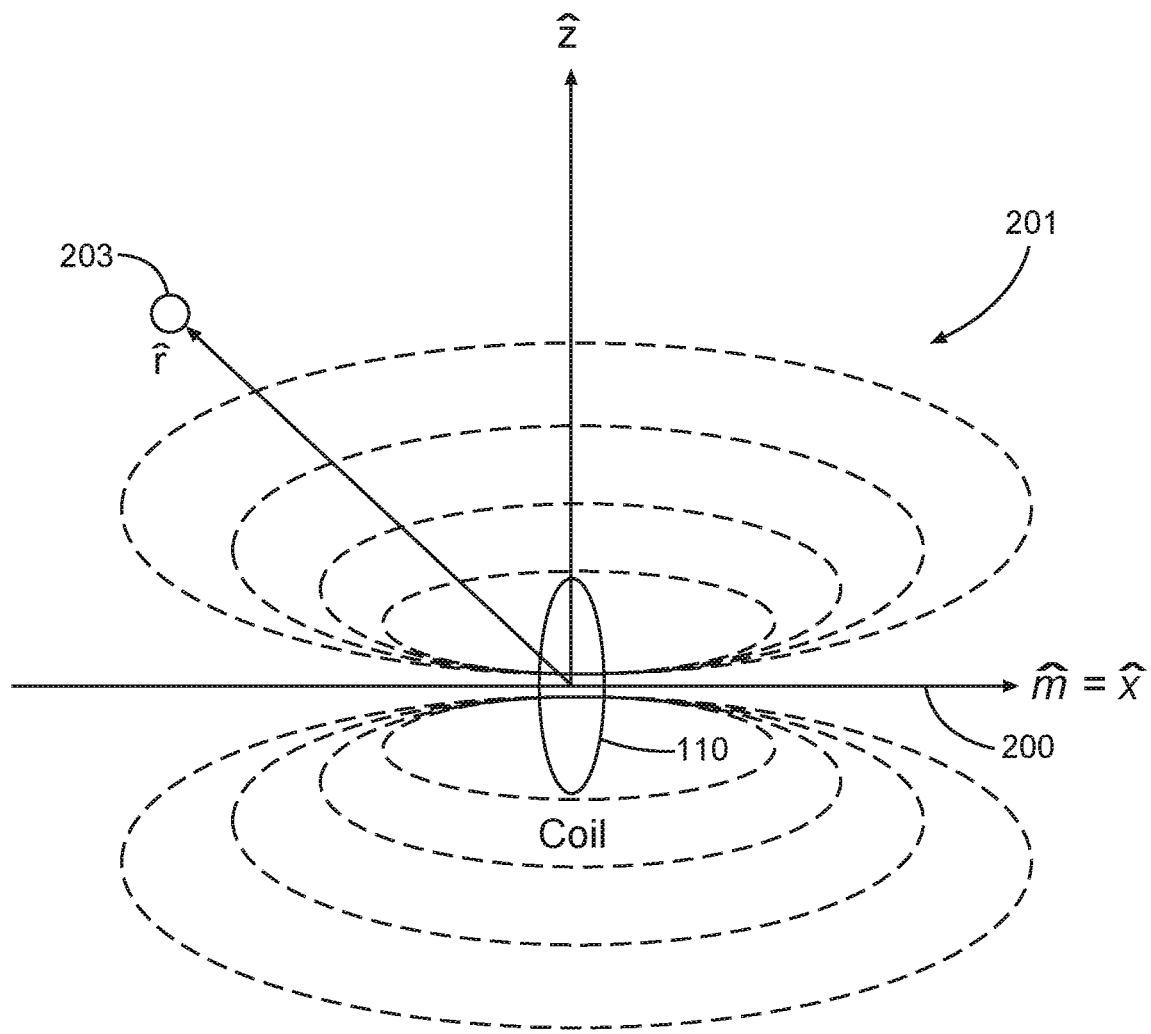
FIG. 2 is a diagram showing a magnetic field of a coil carrying a current and an equivalent magnetic dipole, according to aspects of the present disclosure.

FIG. 2 is a diagram showing a magnetic field 201 of the transmitter coil 110 carrying a current and an equivalent magnetic dipole 200, according to aspects of the present disclosure. The transmitter coil 110 is carrying a current and rotating around the z-axis to induce the magnetic field 201 in the vicinity of the coil 110. The transmitter coil 110 is shown having a magnetic dipole moment 200 in the x-direction (i.e. a coil that lies in the y-z plane) and produces an electric field ($\vec{E}$) around it.

The magnetic field 201 of the transmitter coil 110 is described by an idealized magnetic dipole of magnetic moment m. The magnetic field $\vec{B}(\vec{r})$ of the magnetic dipole pointing in the direction $\hat{m}$ and having a strength of m Weber meters at the observation point 203 at a distance r from the transmitter coil 110 is given by:

$$\vec{B}(\vec{r}) = 3\frac{(\vec{m}, \vec{r})\vec{r}}{r^5} - \frac{\vec{m}}{r^3} \quad (2)$$

In a set of cylindrical coordinates with polar angle θ referenced to the magnetic dipole moment, the magnetic field of a point dipole is given by:

$$B_r = 2\frac{m}{4\pi r^3}\cos\theta \quad (3a)$$

$$B_\theta = \frac{m}{4\pi r^3}\sin\theta \quad (3b)$$

where r is the distance from the center of the dipole to the observation point 203 and θ is the angle between a vector from the center of the dipole to the observation point and magnetic moment $\hat{m}$.

As seen in the equations (3), the magnetic field at the observation point 203 depends on the distance and also orientation of the coil. When the coil (magnetic dipole moment in) rotates, the azimuth angle of the coil axis with respect to a reference direction will change as does the signal level.

Referring again to FIG. 1, if the transmitter coil 110 rotates around the z-axis, the magnetic field around the target well will change and the induced current on the target well can be written as:

$$I_t = I_m \cos(\emptyset_T) \quad (4)$$

where $\emptyset_T$ represents the azimuth angle between transmitter coil's magnetic dipole moment and the y-axis and $I_m$ represents the maximum induced current on the target well which depends on the magnetic dipole moment of the coil, the frequency of the coil current, and the distance and properties of the formation and target casing.

The receiver coils 120, 121 are receiving the signal directly from the transmitter coil 110 and also the magnetic field caused by $I_t$ as described in equation (1). So the signal at receiver Rx can be written as:

$$V = S_t \cos(\emptyset_T)\cos(\emptyset_R) + S_D \cos(\emptyset_T - \emptyset_R) \quad (5)$$

where $S_D$ represents the direct signal from Tx to Rx and $S_t$ represents a signal caused by the effective induced current on the target well. $\emptyset_R$ represents the azimuth angle between receiver coil's magnetic dipole moment and the y-axis. Since the characteristics of Tx and Rx are known, when the tool gets close to a conductive well, the level of the signal received by the receiver will change and it shows the existence of another well.

Analysis of the EM received data can provide the direction and distance between the target well and the ranging device. In some examples, an inversion algorithm based on the laws governing EM fields can be used to determine the position of the EM transmitter from the EM sensors. This inversion algorithm may be based on deterministic and/or stochastic methods of optimization.

In this disclosure, it is proposed to use Tx/Rx coil antennas to send and receive the magnetic field at multiple azimuth angles around the tool to make the range detection to a conductive target well. There are different scenarios and configurations that may be considered and addressed in the following examples.

The following examples assume the drilling well is ranging from the completed well using a transmitter and receivers in the drilling well. However, using a wireline sonde in the already completed well, the relative distance and direction from the completed well to the drilling well may also be determined if conductive material is present in the drilling well.

Figure 3:
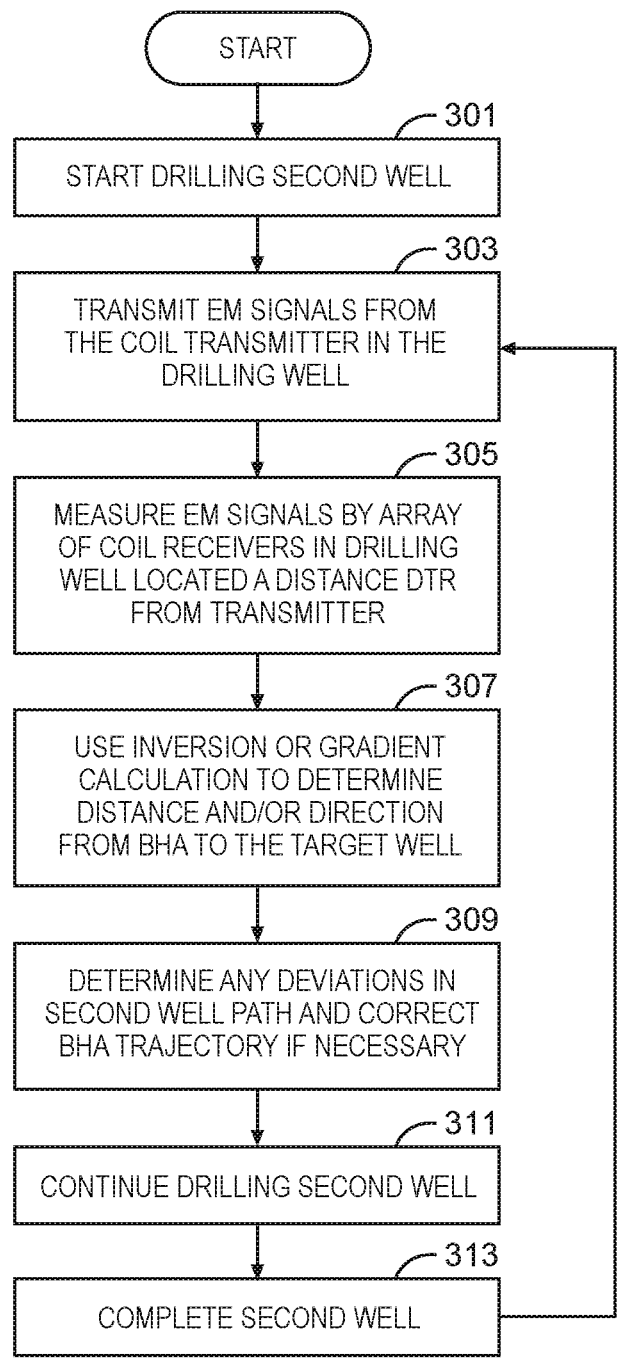
FIG. 3 is a flowchart of a method for EM ranging, according to aspects of the present disclosure.

FIG. 3 is a flowchart of a method for electromagnetic (EM) ranging, according to aspects of the present disclosure. The drilling well is started in block 301. In block 303, EM signals are transmitted from the transmitter coil in the drilling well. This may be accomplished by a tool in the drill string or in a wireline tool, as shown and described subsequently.

In block 305, at least one receiver coil in the drilling well, located a distance of dTR from the transmitter coil, measures the received EM signals from the target pipe that were induced by the transmitted EM signals from the drilling pipe. In block 307, using an inversion or gradient calculation, the relative distance and direction of the target well from the drilling well are determined. This may be a distance from the BHA or a wireline sonde to the target well (e.g., T-intersection, parallel distance). During the measurements, at least one of the transmitter coil or the receiver coil is rotating and the receiver coil is inhibited (i.e., rendered insensitive, blocked) from receiving the transmitted EM signals. In another example, the relative distance and/or direction comprises solving a set of equations (e.g., Fourier transform) where each equation is associated with a different azimuth angle as described subsequently.

In block 309, any deviations in the drilling well path are determined and the trajectory of the BHA is corrected if necessary. In block 311, once any desired corrections are made, the drilling well is continued to be drilled and the process repeats from step 303 until the drilling well is completed 313. The completion may be when the drilling well intersects the target well or, if the drilling well parallels or avoids the target well, the drilling well is completed when the desired depth has been reached.

The method of FIG. 3 may be implemented in a plurality of ways. Two of these examples are illustrated in FIGS. 4 and 5.

Figure 4:
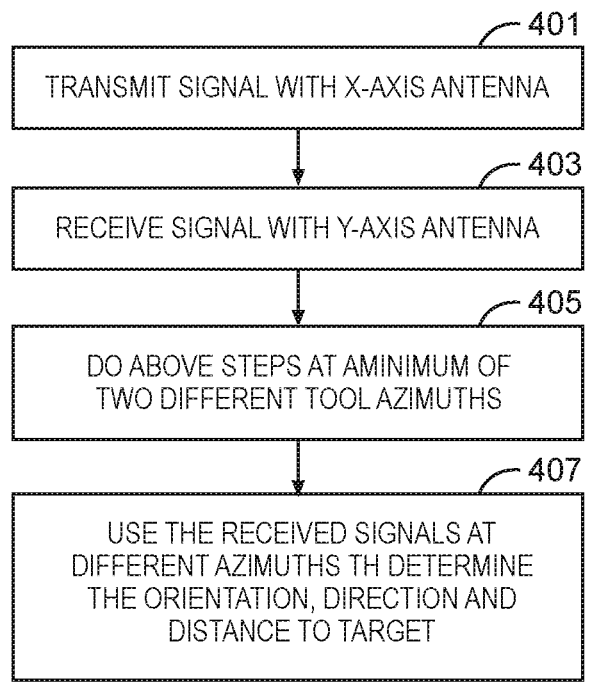
FIG. 4 is a flowchart of a method for EM ranging using an X-Y antenna tool configuration, according to aspects of the present disclosure.

FIG. 4 is a flowchart of a method for EM ranging using an X-Y antenna tool configuration, according to aspects of the present disclosure. This flowchart shows an example method for execution of steps 303 and 305 of the method of FIG. 3. This example inhibits the receiver coil from receiving the direct electromagnetic signal from the transmitter coil by adjusting the relative orientation of the transmitter coil with respect to the receiver coil.

In block 401, an EM signal is transmitted from a transmitter coil having an axis substantially along the x-axis. In block 403, the receiver coils, having an axis substantially along the y-axis, receive the EM signals from the target well. Using this orthogonal orientation of the antenna coils, the direct signal from the transmitter to the receivers is not seen by the receivers. In block 405, steps 401 and 403 are repeated for at least two azimuth orientations of the tool comprising the transmitter and receivers (e.g., the tool is rotating). In block 407, using the EM signals received at the different azimuths, the orientation, direction, and distance to the target well may be determined using an inversion or gradient method.

Figure 5:
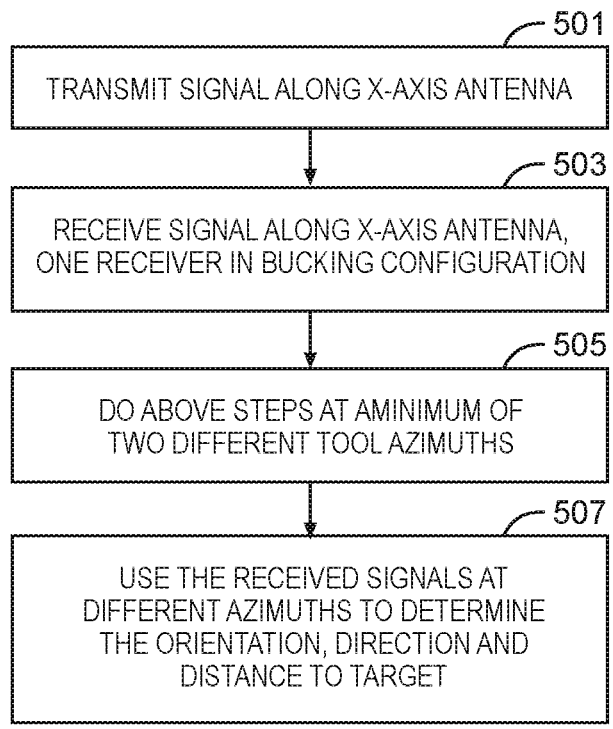
FIG. 5 is a flowchart of a method for EM ranging using a rotating coil antenna tool with bucking receiver and transmitter, according to aspects of the present disclosure.

FIG. 5 is a flowchart of a method for EM ranging using a rotating coil antenna tool with bucking receiver and transmitter, according to aspects of the present disclosure. This flowchart shows another example method for execution of steps 303 and 305 of the method of FIG. 3.

In block 501, an EM signal is transmitted from a transmitter coil having an axis substantially along the x-axis. In block 503, the receiver coils, having an axis substantially along the x-axis, receive EM signals from the target well. The receiver coils in this example are in a bucking configuration in order to reduce or eliminate the direct signal from the transmitter coil.

A receiver coil in a bucking configuration is designed to buck out, or reduce, the direct coupling between transmitter and receiver coils. The direct coupling signal is far larger than the formation signal. The bucking receiver coil is wound with the opposite polarity to the main receiver coil and placed in series with it at a location that reduces the direct coupling to other receiver coils.

In block 505, steps 501 and 503 are repeated for at least two azimuth orientations of the tool comprising the transmitter and receivers. In block 507, using the EM signals received at the different azimuths, the orientation, direction, and distance to the target well may be determined using an inversion or gradient method.

Other methods for implementing the ranging method of FIG. 3 include transmitting a first EM signal at a plurality of azimuth angles and receiving a second. EM signal at a single azimuth angle; transmitting the first EM signal at a single azimuth angle and receiving the second EM signal at a plurality of azimuth angles; transmitting the first EM signal at a plurality of azimuth angles and receiving the second EM signal at the plurality of azimuth angles; and transmitting the first EM signal at a first plurality of azimuth angles and receiving the second. EM signal at a second plurality of azimuth angles.

The above-described methods may be implemented in various scenarios. The following scenario descriptions are only for purposes of illustration as others are possible. Unless otherwise stated, these scenarios assume the following properties for the target well and the antenna coils. The target well is assumed to be a hollow metal pipe with the following properties: conductivity $\sigma=10^6$ Siemens per meter (S/m), relative electric permittivity $\varepsilon_r=1$, relative magnetic permeability $\mu_r=60$, OD=0.2 meter (m), and ID=0.178 m. The length of the target well is assumed to be approximately 600 m and the transmitter coil is assumed to be located around the mid-point of the target well at a distance of R as shown in FIG. 1.

The transmitter and receiver coils have a diameter of approximately 171.45 mm with N=120 turns. The transmitter coil is carrying current I=1 A at a frequency of approximately 10 Hz. The coil that is closest to the drill bit is at a distance of approximately 1 m. The formation is assumed to be homogeneous with resistivity of $R_f=10$ Ω·m and electric permittivity $\varepsilon_{fr}$=magnetic permeability $\mu_{fr}=1$.

In a first scenario, the transmitter rotates around the z-axis to send EM signals at multiple, different azimuth angles during the measurement while the receiver is set at a single azimuth angle. The Tx signals are assumed to be transmitted at a minimum of two different azimuth angles ($\emptyset_1$ and $\emptyset_2$). Transmission of the signals at the plurality of azimuth angles may be achieved by varying the azimuth angle of the tool. This concept is illustrated in the plots of FIG. 6

Figure 6:
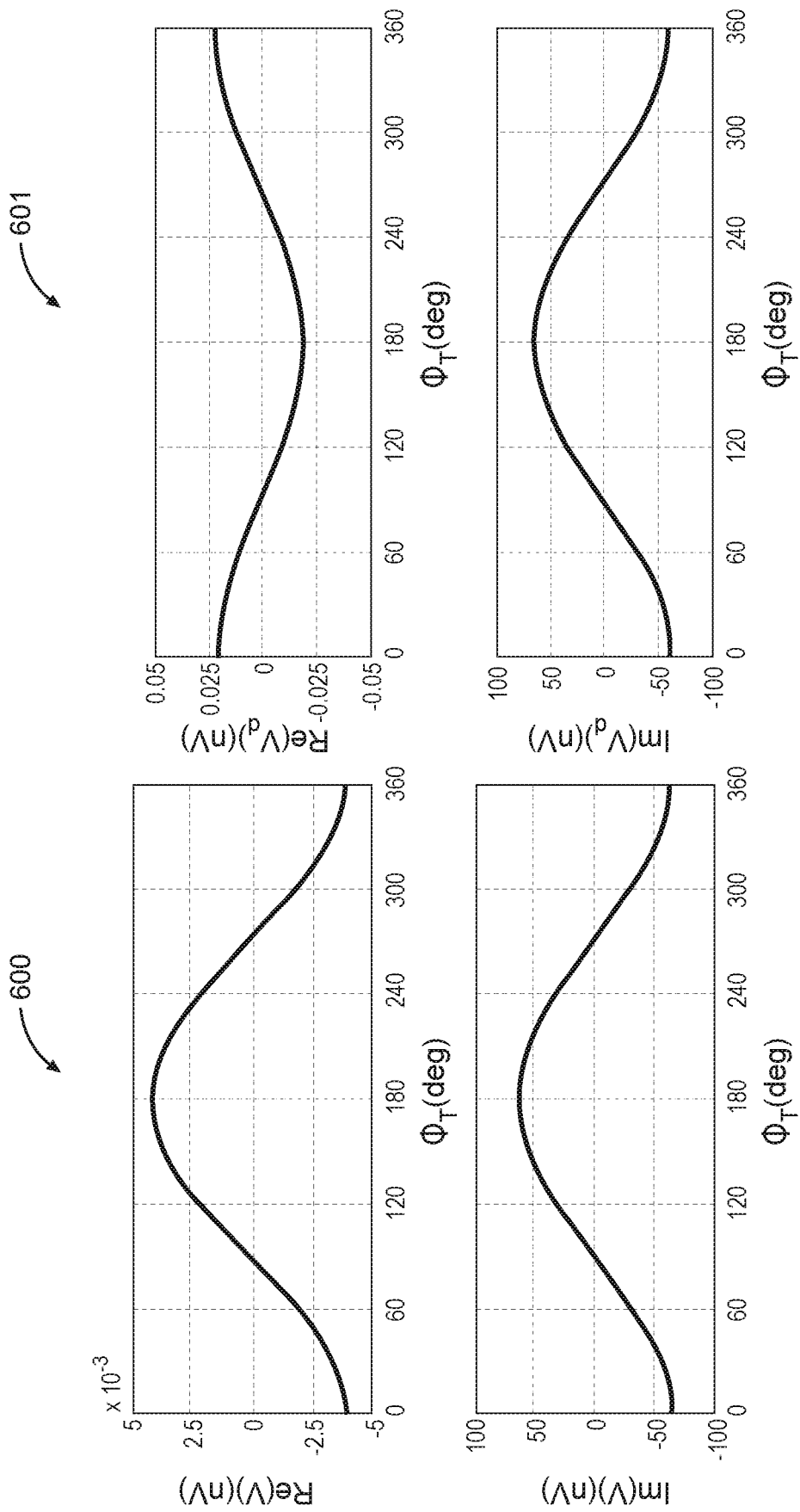
FIG. 6 shows plots of a signal at a receiver with Tx rotating around z-axis to send signals at different azimuth angles and Rx at a single azimuth angle along y-axis, according to aspects of the present disclosure.

FIG. 6 are plots of a signal at a receiver with $T_x$ rotating around z-axis to send signals at different azimuth angles and $R_x$ at a single azimuth angle along y-axis, according to aspects of the present disclosure. This figure shows the real and imaginary part of the signal at receiver at different azimuth angle orientations of the transmitter (transmitter is rotating around z-axis to send signal at different azimuth angles, $\emptyset_T$). The left column of plots 600 shows the total signal received by the receiver coils. The right column of plots 601 shows the direct signal coming from the transmitter to the receiver. In this figure, it is assumed that receiver moment is orientated along y-axis and the receiver coils are located closest to the drill bit. The distance between receiver coils and the target well is R=10 m and the transmitter is separated by dTR=9.14 m from the receiver.

In another scenario, the transmitter is fixed at a single azimuth angle and the receiver are located at multiple azimuth angles. The receiver rotates around the z-axis to receive signal at different azimuth angles during the measurement while the transmitter coil is set at a single azimuth angle. The plots of FIG. 6 also illustrate this scenario.

In another scenario, the transmitter coil and receiver coils are located at multiple azimuth angles together. For example, the transmitter and receiver rotate together around the z-axis to send and receive signal at multiple azimuth angles around the tool as illustrated in FIG. 7.

Figure 7:
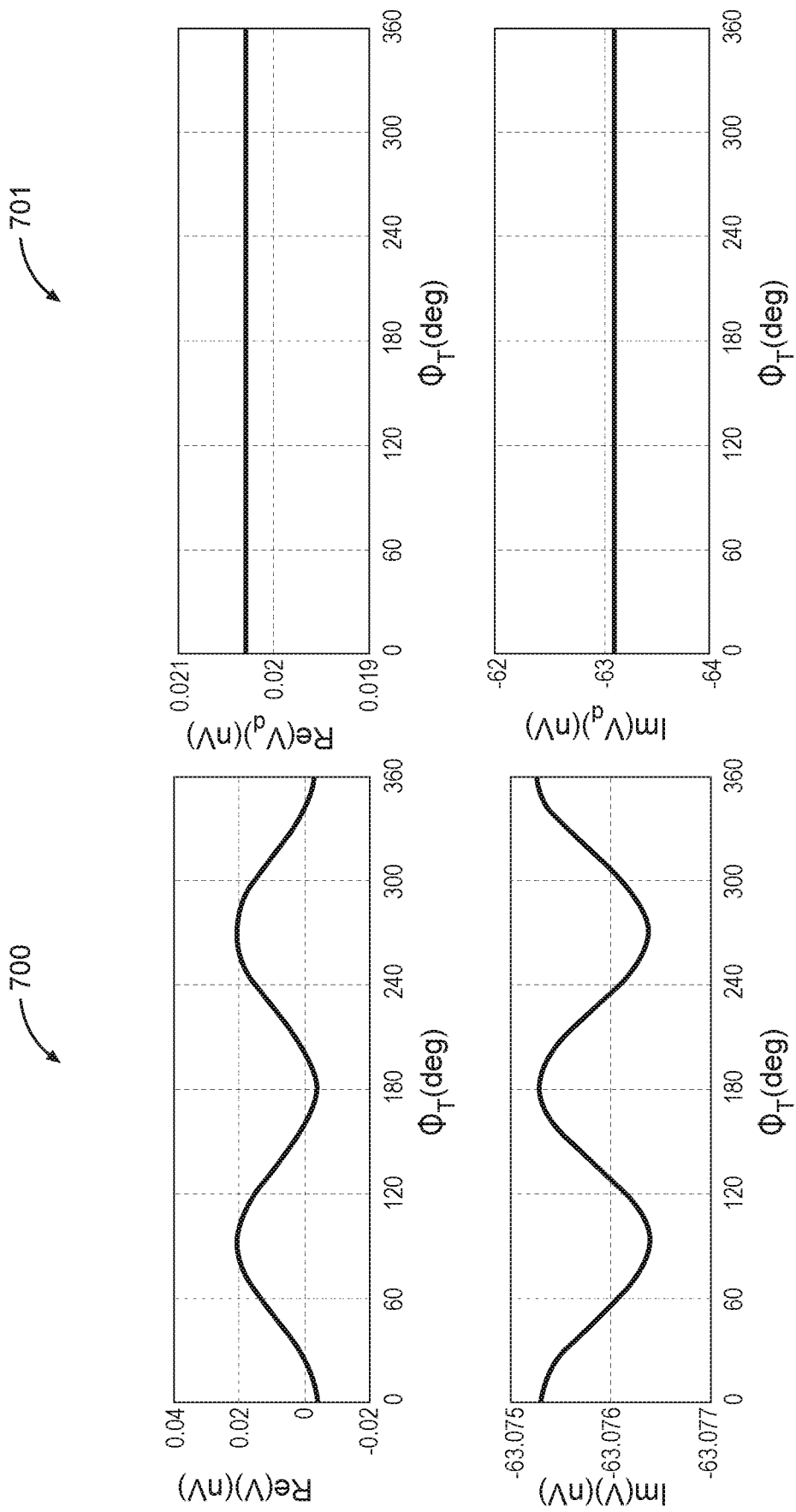
FIG. 7 shows plots of a signal at a receiver with Tx and Rx rotating around z-axis to send signals at multiple azimuth angles, according to aspects of the present disclosure.

FIG. 7 are plots of a signal at a receiver with $T_x$ and $R_x$ rotating around the z-axis to send signals at multiple azimuth angles, according to aspects of the present disclosure. The left column of plots 700 shows the total signal received by the receiver coils while the right column of plots 701 shows the direct signal coming from the transmitter coil to the receiver coils.

As expected from equation 5 above, the signal at the receiver will be $V=S_t(1+\cos(2\emptyset_0))/2+S_D$. Thus, the received signal includes an offset. Since the transmitter and receiver are rotating together, the direct signal will be the same for different azimuth angle orientations as seen in the left column plots 701 of FIG. 7. At least three different azimuth angles are used to locate the transmitter and receiver. If a measurement is done at multiple azimuth angles, a Fourier transform may be applied to the received signal to get the Fourier spectrum of the received magnetic field and, thus, determine a relative distance and/or direction to another well. Another method to obtain any of the unknown distance/direction parameters St and Sd is to form a set of equations from equation (5) associated with each different azimuth angle $\emptyset_0$ and solve the set of equations. As discussed, the equations may be solved with a Fourier transform (e.g., Fast Fourier Transform).

In yet another scenario, the transmitter and receiver are located at multiple different azimuth angles with respect to each other. In other words, the transmitter and receiver azimuth angles vary but not together. In this scenario, the transmitter and receiver are located at different azimuth angles but not the same locations together at the same time. Thus they transmit and receive signals at different, multiple azimuth angles.

In yet another scenario, multiple receiver coils are used to calculate the distance to the target well by locating the receiver coils at a fixed distance from each other. The receiver coils will measure the signal at different locations and, by knowing the fixed distance between the receivers, the distance from the receiver coils to the target well may be determined by applying the gradient method.

However, receiver coils also measure the direct signal created by the transmitter. To remove this direct signal, several approaches may be considered. One approach is to use bucking receivers that are wound in an opposite direction relative to the coil winding of the main receivers. The bucking receiver may then be located in such a way that the imaginary component of the direct signal between the main-bucking receiver combinations is cancelled (e.g., between the main receiver coil and the transmitter coil).

In a T-intersection ranging scenario (e.g., orthogonal wells), the receiver coils are separated along the tool axial axis (e.g., z-axis in FIG. 1). But in a parallel or oblique ranging scenario, the receiver coils may be separated along a radial direction (i.e., peripherally around the tool).

Yet another scenario uses an X-Y configuration for the transmitter and receiver and transmits/receives signals at multiple azimuth angles. In this configuration, the transmitter and receiver are set in the X-Y configuration (i.e., orthogonal azimuth angles), as illustrated in FIG. 1. The transmitter and receiver thus rotate together during a measurement. By using the X-Y configuration, the direct signal from the transmitter to the receiver is eliminated and the receiver only receives the signal from the target well. This concept is illustrated in the plots of FIG. 8.

Figure 8:
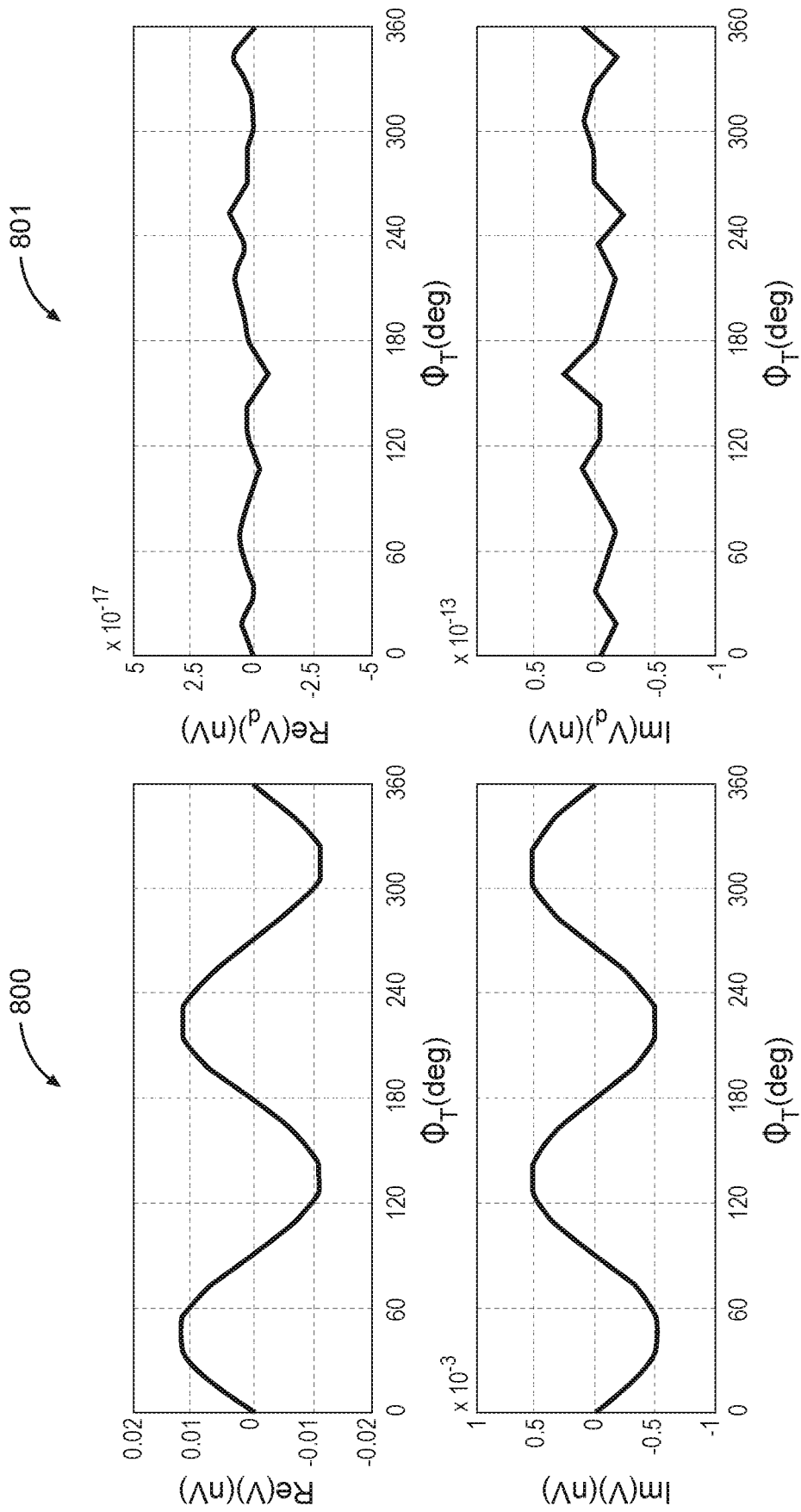
FIG. 8 shows plots of signals resulting from a system with Tx and Rx in an X-Y configuration and rotating together, according to aspects of the present disclosure.

FIG. 8 are plots of signals resulting from a system with Tx and Rx in an X-Y configuration and rotating together, according to aspects of the present disclosure. The plots of the total signal received by the receiver are shown in the left column of plots 800 and the plots of the direct signal received by receiver are shown in the right column of plots 801. It can be seen that the direct signal has been almost entirely blocked at the receiver by using X-Y configuration.

Yet another scenario uses the X-Y configuration for transmitter and receiver in a gradient receiver configuration. To calculate the distance to the target well, a plurality of receiver coils may be used that are set at a fixed distance from each other. In this scenario, if the transmitter transmits on the x-axis, the receivers receive on the y-axis. This configuration then rotates together.

In one example of this scenario, the two receiver coils are separated by $\Delta S=0.914$ m along the z-axis. The pair of receiver coils measures the magnetic field at different points along the z-axis such that the distance between the set of receiver coils and the target well may be calculated using the gradient fields. This scenario is illustrated in the plot of FIG. 9.

Figure 9:
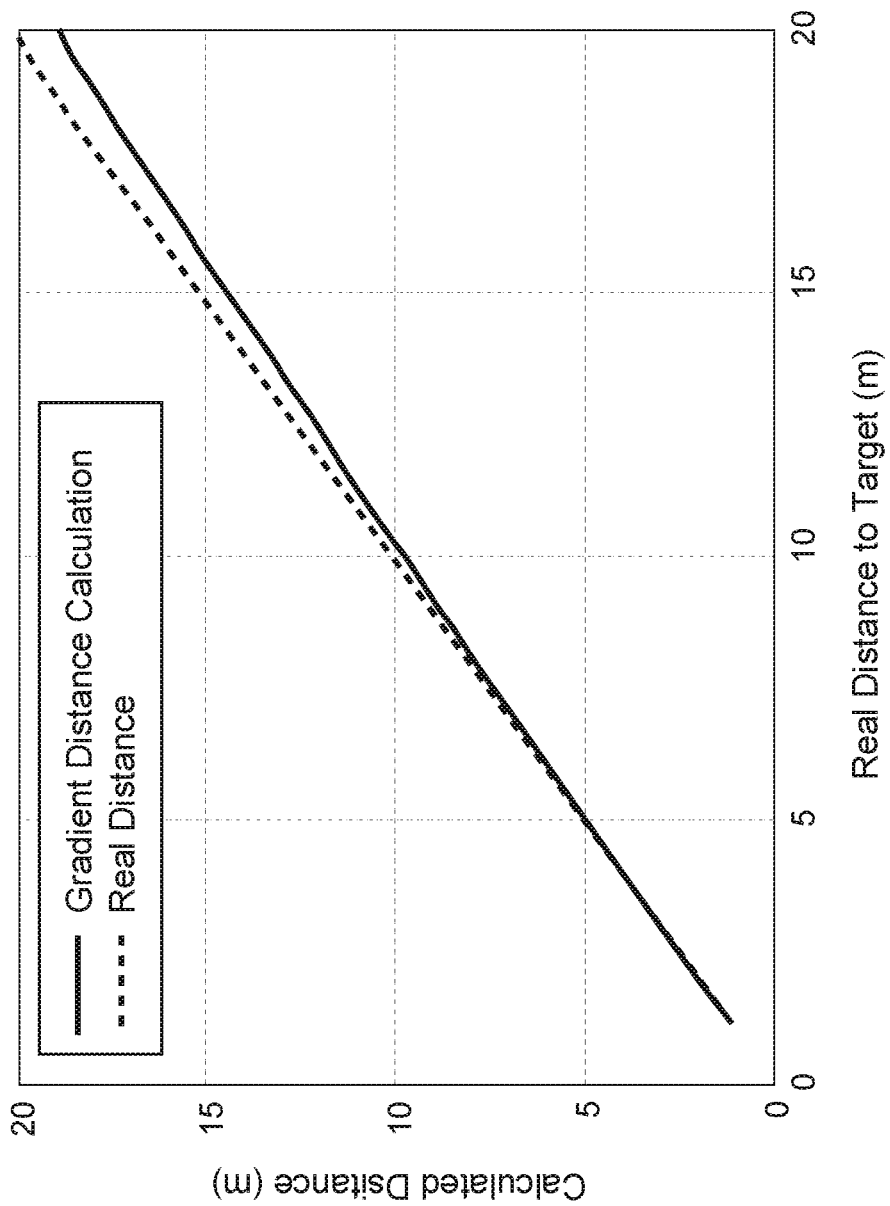
FIG. 9 shows a plot of calculated distances and real distances with Tx and Rx in an X-Y configuration, according to aspects of the present disclosure.

FIG. 9 is a plot of calculated distances and real distances with $T_x$ and $R_x$ in an X-Y configuration, according to aspects of the present disclosure. This figure shows the distance calculation between the center of the receiver pair and the target well for a range of 1 m to 20 m. The dotted line shows an actual distance while the solid line shows the distance calculated using the gradient distance calculation.

In yet another scenario, the receiver or transmitter are located on and rotate with the drill bit. Yet another scenario locates the receiver or transmitter immediately adjacent to the drill bit on the drillstring. Improved performance and stronger signals may be achieved when one of the receivers or transmitter is either on the drill bit or very close to the drill bit.

The above-described scenarios may be implemented individually or in any combination. These scenarios are for illustration purposes only as other scenarios and scenario combinations are possible.

FIG. 10 is a diagram of a drilling system, according to aspects of the present disclosure. This diagram illustrates a drilling well that is ranging towards a target well 1091 using the rotating coil antenna tool 1000 in the BHA 1120.

The system 1064 includes a drilling rig 1002 located at the surface 1004 of a well 1006. The drilling rig 1002 may provide support for a drillstring 1008. The drillstring 1008 may operate to penetrate the rotary table 1010 for drilling the borehole 1012 through the subsurface formations 1090. The drillstring 1008 may include a drill pipe 1018 and the BHA 1020 (e.g., drill string), perhaps located at the lower portion of the drill pipe 1018.

The BHA 1020 may include drill collars 1022, a downhole tool 1024, stabilizers, sensors, an RSS, a drill bit 1026, as well as other possible components. The drill bit 1026 may operate to create the borehole 1012 by penetrating the surface 1004 and the subsurface formations 1090. The BHA 1020 may further include the rotating coil antenna tool 1000 examples as described previously. For example, the rotating coil antenna system 1000 may be part of the drill bit or part of the downhole tool 1024, as shown.

During drilling and ranging operations within the borehole 1012 towards the target well 1091, the drillstring 1008 (perhaps including the drill pipe 1018 and the BHA 1020) may be rotated by the rotary table 1010. Although not shown, in addition to or alternatively, the BHA 1020 may also be rotated by a motor (e.g., a mud motor) that is located downhole. The drill collars 1022 may be used to add weight to the drill bit 1026. The drill collars 1022 may also operate to stiffen the BHA 1020, allowing the BHA 1020 to transfer the added weight to the drill bit 1026, and in turn, to assist the drill bit 1026 in penetrating the surface 1004 and subsurface formations 1090.

During drilling operations, a mud pump 1032 may pump drilling fluid (sometimes known by those of ordinary skill in the art as "drilling mud") from a mud pit 1034 through a hose 1036 into the drill pipe 1018 and down to the drill bit 1026. The drilling fluid can flow out from the drill bit 1026 and be returned to the surface 1004 through an annular area 1040 between the drill pipe 1018 and the sides of the borehole 1012. The drilling fluid may then be returned to the mud pit 1034, where such fluid is filtered. In some examples, the drilling fluid can be used to cool the drill bit 1026, as well as to provide lubrication for the drill bit 1026 during drilling operations. Additionally, the drilling fluid may be used to remove subsurface formation cuttings created by operating the drill bit 1026.

A workstation 1092 including a controller 1096 may include modules comprising hardware circuitry, a processor, and/or memory circuits that may store software program modules and objects, and/or firmware, and combinations thereof that are configured to execute at least the methods described previously. The workstation 1092 may also include modulators and demodulators for modulating and demodulating data transmitted downhole through the cable 1030 or telemetry received through the cable 1030 from the downhole environment. The workstation 1092 and controller 1096 are shown near the rig 1002 only for purposes of illustration as these components may be located at remote locations. The workstation 1092 may include the surface portion of the dual polarization system.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Figure 11:
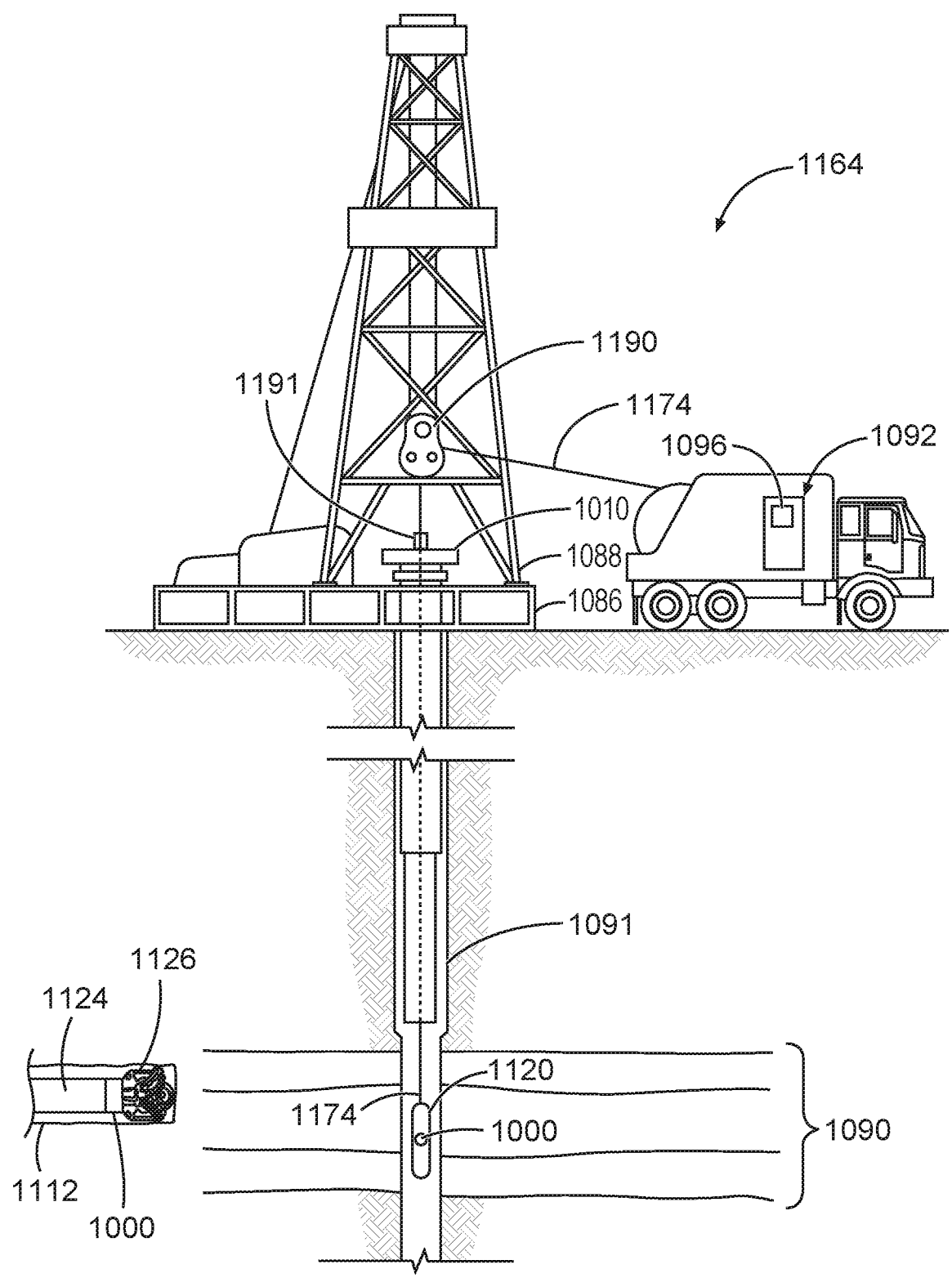
FIG. 11 is a diagram of a wireline system, according to aspects of the present disclosure.

FIG. 11 is a diagram of a wireline system, according to aspects of the present disclosure. The rotating coil antenna tool 1000 may be used in the wireline system in order to determine a relative direction and distance to a well 1112 being drilled, as described previously.

The system 1164 may comprise at least one wireline logging tool body 1120, as part of a wireline logging operation in a borehole 1012, including the rotating coil antenna tool 1000 described previously.

A drilling platform 1086 equipped with a derrick 1088 that supports a hoist 1190 can be seen. Drilling oil and gas wells is commonly carried out using a string of drill pipes connected together so as to form a drillstring that is lowered through a rotary table 1010 into the borehole 1012. Here it is assumed that the drillstring has been temporarily removed from the borehole 1012 to allow the wireline logging tool body 1120, such as a probe or sonde with the rotating coil antenna tool 1000, to be lowered by wireline or logging cable 1174 (e.g., slickline cable) into the borehole 1012. Typically, the wireline logging tool body 1120 is lowered to the bottom of the region of interest and subsequently pulled upward at a substantially constant speed.

During the upward trip, at a series of depths, the tool with the single rotating coil antenna tool 1000 may be used to determine a relative distance and/or direction to a drilling well. The resulting data may be communicated to a surface logging facility (e.g., workstation 1092) for processing, analysis, and/or storage. The workstation 1092 may have a controller 1096 that is able to execute any methods disclosed herein.

Figure 12:
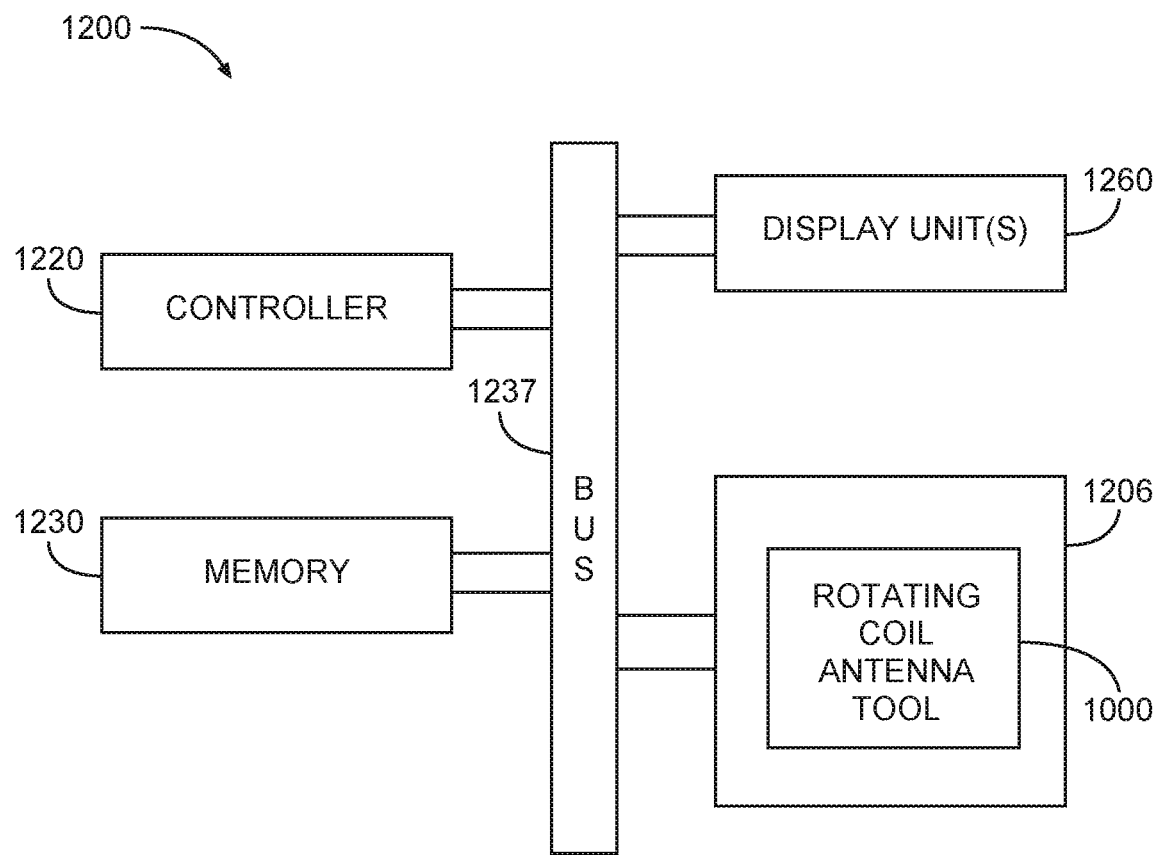
FIG. 12 is a block diagram of an example system operable to implement the activities of multiple methods, according to various aspects of the present disclosure.

FIG. 12 is a block diagram of an example system operable to implement the activities of multiple methods, according to various aspects of the present disclosure. The system 1200 may include a tool housing 1206 having the rotating coil antenna tool apparatus 1000 disposed therein. The system 1200 may be implemented as shown in FIGS. 10 and 11 with reference to the workstation 1092 and controller 1096.

The system 1200 may include a controller 1220, a memory 1230, and a communications unit 1235. The memory 1230 may be structured to include a database. The controller 1220, the memory 1230, and the communications unit 1235 may be arranged to operate as a processing unit to control operation of the rotating coil antenna tool apparatus 1000 and execute any methods disclosed herein in order to determine the condition of borehole pipes. The processing unit may be located in the tool housing 1206 in order to control operation of the rotating coil antenna tool apparatus 1000.

The communications unit 1235 may include communications capability for communicating from downhole to the surface or from the surface to downhole. Such communications capability can include a telemetry system such as mud pulse telemetry. In another example, the communications unit 1235 may use combinations of wired communication technologies and wireless technologies.

The system 1200 may also include a bus 1237 that provides electrical conductivity among the components of the system 1200. The bus 1237 can include an address bus, a data bus, and a control bus, each independently configured or in an integrated format. The bus 1237 may be realized using a number of different communication mediums that allows for the distribution of components of the system 1200. The bus 1237 may include a network. Use of the bus 1237 may be regulated by the controller 1220.

The system 1200 may include display unit(s) 1260 as a distributed component on the surface of a wellbore, which may be used with instructions stored in the memory 1230 to implement a user interface to monitor the operation of the tool 1206 or components distributed within the system 1200. The user interface may be used to input parameter values for thresholds such that the system 1200 can operate autonomously substantially without user intervention in a variety of applications. The user interface may also provide for manual override and change of control of the system 1200 to a user. Such a user interface may be operated in conjunction with the communications unit 1235 and the bus 1237.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Some examples may use a wireline active ranging system to determine a relative distance and relative direction from a first well (e.g., ranging well) to a second well (e.g., target well) until the ranging well reaches a desired distance. Thereafter, a logging while drilling (LWD) EM rotating coil tool, as described previously, may be used to maintain or adjust (e.g., increase, decrease) the desired distance while drilling. The desired distance may be defined as the distance at which the EM rotating coil tool can accurately track the target well. This distance may vary depending on the frequency used by the logging tool as well as the desired accuracy. A wireline operation may use the EM rotating coil tool for determining a range to a target well while the drilling operation may use the tool for ranging while drilling the ranging well.

The wireline ranging system may first be used to provide distance and direction to the second well (target well) since it can provide a higher accuracy in determination of distance and longer range detection based on inversion or gradient measurements with very low operating frequency. However, since the wireline uses multiple trip-in and trip-out drilling activities to achieve the desired ranging requirements, the EM rotating coil system may be introduced to guide the logging tool in the correct direction relative to the target well or to maintain a desired direction relative to the target well. Such measurements may be sensitive to the formations surrounding the tool as well as to the conductive casing in the target well.

Many embodiments may be realized. Several examples will now be described.

Example 1 is a method comprising: transmitting a first electromagnetic signal from a transmitter coil in a tool; receiving a second electromagnetic signal with a receiver coil in the tool, wherein at least one of the transmitting coil or the receiver coil is rotating; and determining a relative distance and/or direction to a well based on the second electromagnetic signal, wherein the receiver coil is inhibited from receiving the first electromagnetic signal.

In Example 2, the subject matter of Example 1 can optionally include wherein determining the relative distance and/or direction comprises solving a set of equations where each equation is associated with a different azimuth angle.

In Example 3, the subject matter of Examples 1-2 can optionally include wherein solving the set of equations comprises using a Fourier transform of the equations and the distance and/or direction are determined from the Fourier transform.

In Example 4, the subject matter of Examples 1-3 can optionally include wherein the receiver coil is inhibited from receiving the first electromagnetic signal by a second receiver coil acting as a bucking coil for receiving the first electromagnetic signal.

In Example 5, the subject matter of Examples 1-4 can optionally include wherein transmitting the first electromagnetic signal comprises transmitting the first electromagnetic signal at a plurality of azimuth angles and receiving the second electromagnetic signal comprises receiving the second electromagnetic signal at a single azimuth angle.

In Example 6, the subject matter of Examples 1-5 can optionally include wherein transmitting the first electromagnetic signal comprises transmitting the first electromagnetic signal at a single angle and receiving the second electromagnetic signal comprises receiving the second electromagnetic signal at a plurality of angles.

In Example 7, the subject matter of Examples 1-6 can optionally include wherein transmitting the first electromagnetic signal comprises transmitting the first electromagnetic signal at a plurality of angles and receiving the second electromagnetic signal comprises receiving the second electromagnetic signal at the plurality of angles.

In Example 8, the subject matter of Examples 1-7 can optionally include wherein transmitting the first electromagnetic signal comprises transmitting the first electromagnetic signal at a first plurality of angles and receiving the second electromagnetic signal comprises receiving the second electromagnetic signal at a second plurality of angles.

In Example 9, the subject matter of Examples 1-8 can optionally include wherein a second receiver coil is located a predetermined distance from the receiver coil in the tool, the method further comprising determining the relative distance and/or direction to the well in response to an electromagnetic field gradient.

In Example 10, the subject matter of Examples 1-9 can optionally include wherein the receiver coil is inhibited from receiving the first electromagnetic signal by adjusting the relative orientation of the transmitter coil with respect to the receiver coil.

In Example 11, the subject matter of Examples 1-10 can optionally include rotating the transmitter coil and the receiver coil together.

In Example 12, the subject matter of Examples 1-11 can optionally include wherein the well is substantially orthogonal to a drilling well, the method further comprising adjusting a drilling direction of the drilling well, in response to the second electromagnetic signal, such that the drilling well either intersects the well or avoids the well.

Example 13 is a tool apparatus comprising: a transmitter coil having a magnetic moment radially oriented at a first azimuthal angle and configured to transmit a first electromagnetic signal at the first azimuthal angle; a receiver coil having a magnetic moment radially oriented at a second azimuthal angle and configured to receive a second electromagnetic signal at the second azimuthal angle, wherein at least one of the transmitter coil or the receiver coil is configured to rotate while transmitting or receiving; and a controller coupled to the transmitter coil and the receiver coil, the controller configured to determine a relative distance and/or direction to a well based on the second electromagnetic signal.

In Example 14, the subject matter of Example 13 can optionally include wherein the transmitter coil is further configured to rotate around an axis and transmit the first electromagnetic signal at a plurality of azimuthal angles.

In Example 15, the subject matter of Examples 13-14 can optionally include wherein the receiver coil is further configured to rotate around the axis and receive the second electromagnetic signal at the plurality of azimuthal angles.

In Example 16, the subject matter of Examples 13-15 can optionally include wherein the receiver coil is further configured to rotate around the axis and receive the second electromagnetic signal at a second plurality of azimuthal angles different from the plurality of azimuthal angles.

In Example 17, the subject matter of Examples 13-16 can optionally include a second receiver coil located a predetermined distance from the receiver coil in the tool apparatus.

In Example 18, the subject matter of Examples 13-17 can optionally include wherein the second receiver coil comprises a bucking configuration relative to the receiver coil.

In Example 19, the subject matter of Examples 13-18 can optionally include wherein the first azimuthal angle is orthogonal to the second azimuthal angle.

Example 20 is a system comprising: a tool housing; a transmitter disposed in the tool housing and having a magnetic moment radially oriented at a first azimuthal angle, the transmitter configured to transmit a first electromagnetic signal along the first azimuthal angle; a receiver disposed in the tool housing and having a magnetic moment radially oriented at a second azimuthal angle, the receiver configured to receive a second electromagnetic signal along the second azimuthal angle; and a controller coupled to the transmitter and the receiver and configured to determine a relative distance and/or direction to a target well while at least one of the transmitter or the receiver magnetic moments rotates.

In Example 21, the subject matter of Example 20 can optionally include wherein the tool housing is disposed in a wireline tool or a drillstring.

In Example 22, the subject matter of Examples 20-21 can optionally include wherein the tool housing is coupled to a drill bit of the drillstring.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
transmitting a first electromagnetic signal from a transmitter coil in a tool positioned in a portion of a drilling well, the drilling well extending along a first axis;
receiving a second electromagnetic signal from a target well with a receiver coil in the tool, the second electromagnetic signal induced by the first electromagnetic signal, wherein at least one of the transmitter coil or the receiver coil is rotating around the first axis to acquire the second electromagnetic signal at the receiver coil at a plurality of different relative azimuth angles of orientation between the transmitter coil and the receiver coil, and wherein the receiver coil is inhibited from receiving the first electromagnetic signal; and
determining a relative distance and/or direction between the tool and the target well based on the acquired second electromagnetic signal.

2. The method of claim 1, wherein determining the relative distance and/or direction comprises solving a set of equations where each equation is associated with one of the plurality of different relative azimuth angles of orientation.

3. The method of claim 2, wherein solving the set of equations comprises using a Fourier transform of the equations and the relative distance and/or direction are determined from the Fourier transform.

4. The method of claim 1, wherein the receiver coil is inhibited from receiving the first electromagnetic signal by a second receiver coil acting as a bucking coil for receiving the first electromagnetic signal.

5. The method of claim 1, wherein transmitting the first electromagnetic signal comprises transmitting the first electromagnetic signal at a plurality of azimuth angles of a magnetic dipole moment of the transmitter coil, and receiving the second electromagnetic signal comprises receiving the second electromagnetic signal at a single azimuth angle of a magnetic dipole moment of the receiver coil.

6. The method of claim 1, wherein transmitting the first electromagnetic signal comprises transmitting the first electromagnetic signal at a single azimuth angle of a magnetic dipole moment of the transmitter coil, and wherein receiving the second electromagnetic signal comprises receiving the second electromagnetic signal at a plurality of azimuth angles of a magnetic dipole moment of the receiver coil.

7. The method of claim 1, wherein transmitting the first electromagnetic signal comprises transmitting the first electromagnetic signal at a plurality of azimuth angles of a magnetic dipole moment of the transmitter coil, and wherein receiving the second electromagnetic signal comprises receiving the second electromagnetic signal at a plurality azimuth angles of a magnetic dipole moment of the receiver coil.

8. The method of claim 1, wherein transmitting the first electromagnetic signal comprises transmitting the first electromagnetic signal at a first plurality of azimuth angles of a magnetic dipole moment of the transmitter coil, and wherein receiving the second electromagnetic signal comprises receiving the second electromagnetic signal at a second plurality of angles of a magnetic dipole moment of the receiver coil.

9. The method of claim 1, wherein a second receiver coil is located a predetermined distance along the first axis from the receiver coil in the tool, the method further comprising determining the relative distance and/or direction between the tool and the target well in response to an electromagnetic field gradient.

10. The method of claim 1, wherein the receiver coil is inhibited from receiving the first electromagnetic signal by adjusting a relative orientation of the transmitter coil with respect to the receiver coil.

11. The method of claim 1, further comprising rotating the transmitter coil and the receiver coil together.

12. The method of claim 1, further comprising adjusting a drilling direction of the drilling well in response to the second electromagnetic signal such that the drilling well either intersects the target well or avoids the target well.

13. A tool apparatus comprising:
a transmitter coil having a transmitter coil magnetic moment that is radially oriented at a first azimuthal angle relative to a tool axis of the tool apparatus and configured to transmit a first electromagnetic signal at the first azimuthal angle;
a receiver coil having a receiver coil magnetic moment that is radially oriented at a second azimuthal angle relative to the tool axis of the tool apparatus, the receiver coil configured to receive a second electromagnetic signal at the second azimuthal angle, the second electromagnetic signal induced in a target well by the first electromagnetic signal, wherein at least one of the transmitter coil or the receiver coil is configured to rotate while transmitting or receiving and wherein a relative azimuth angle between the first azimuthal angle and the second azimuth angle is adjustable based on rotation of at least the transmitter coil or the receiver coil; and
a controller coupled to the transmitter coil and the receiver coil, the controller configured to determine a relative distance and/or direction from the tool apparatus to a target well based on the second electromagnetic signal.

14. The tool apparatus of claim 13, wherein the transmitter coil is further configured to rotate around the tool axis and transmit the first electromagnetic signal at a plurality of azimuthal angles of the transmitter coil magnetic moment.

15. The tool apparatus of claim 14, wherein the receiver coil is further configured to rotate around the tool axis and receive the second electromagnetic signal at the plurality of azimuthal angles of the receiver coil magnetic moment.

16. The tool apparatus of claim 14, wherein the receiver coil is further configured to rotate around the tool axis and receive the second electromagnetic signal at a second plurality of azimuthal angles of the receiver coil magnetic moment different from the plurality of azimuthal angles of the transmitter coil magnetic moment.

17. The tool apparatus of claim 13, further comprising a second receiver coil located a predetermined distance along the tool axis from the receiver coil in the tool apparatus, wherein the second receiver coil comprises a bucking configuration relative to the receiver coil.

18. The tool apparatus of claim 13, wherein the first azimuthal angle is orthogonal to the second azimuthal angle.

19. A system comprising:
a tool housing;
a transmitter coil disposed in the tool housing and having a transmitter coil magnetic moment that is radially oriented at a first azimuthal angle relative to a tool axis of the tool housing, the transmitter coil configured to transmit a first electromagnetic signal along the first azimuthal angle;
a receiver coil disposed in the tool housing and having a receiver coil magnetic moment that is radially oriented at a second azimuthal angle relative to the tool axis of the tool housing, the receiver coil configured to receive a second electromagnetic signal along the second azimuthal angle, the second electromagnetic signal induced in a target well by the first electromagnetic signal, wherein at least one of the transmitter coil or the receiver coil is configured to rotate while transmitting or receiving and wherein a relative azimuth angle between the first azimuthal angle and the second azimuth angle is adjustable based on rotation of at least the transmitter coil or the receiver coil; and
a controller coupled to the transmitter coil and the receiver coil and configured to determine a relative distance and/or direction from the tool housing to a target well while at least one of the magnetic moments of the transmitter coil or the magnetic moment of the receiver coil rotates.

20. The system of claim 19, wherein the tool housing is disposed in a wireline tool or a drillstring such that that the tool housing is coupled to a drill bit of the drillstring.

* * * * *